United States Patent Office 3,574,647
Patented Apr. 13, 1971

3,574,647
LOW DENSITY ZEOLITE EXCHANGE CERAMICS AND METHOD
William H. Flank, Broomall, James E. McEvoy, Morton, and John R. Stuart, Brookhaven, Pa., assignors to Air Products and Chemicals, Inc., Philadelphia, Pa.
No Drawing. Filed Dec. 27, 1967, Ser. No. 693,733
Int. Cl. C04b *33/00*
U.S. Cl. 106—40                                          6 Claims

ABSTRACT OF THE DISCLOSURE

Low density porous ceramic substances are prepared from synthetic calcium-form crystalline zeolites by controlled heating at a temperature of about 900° to 1200° C. followed by cooling. The product is substantially non-zeolitic with X-ray-detectable crystallinity and features structural integrity with unusually low density.

BACKGROUND OF THE INVENTION

The art has many materials and methods for the preparation of low density inorganic compositions which have a variety of uses such as for insulation and structural purposes utilizing the general characteristics of inorganic materials in their fire resistance, resistance to insect and animal life infestation or in growth of mold or the like. Numerous mineral occurring in nature intumesce to a lesser or greater degree in the presence of heat. Such intumescence may be the result of the exfoliation of foliated laminar crystal structures, such as some forms of gypsum or vermiculite. Monoclinic compositions such as spodumene and titanite swell under certain heating conditions. While isometric analcite fuses without intumescence, the rhombohedral chabazite shows some intumescence. A different type of porous natural mineral is exemplified in some forms of pumice which have been derived from magma infused with gaseous bubbles and subsequently solidified on cooling to a relatively low-density structure.

These natural materials vary in the amount of intumescence and their ease of production. Some forms such as expanded vermiculite are commonly employed in industry. Simulated approaches to the low density ceramics obtained from natural sources include low density concrete and foamed glass, both of which forms include forms of cellular inorganic products having artificially-induced cells as the contributing agent to their lower-density porous or foam type nature.

SUMMARY OF THE INVENTION

In accordance with this invention certain synthetic crystalline zeolites, appropriately adjusted in alkali and alkaline earth metal ions in the base exchange positions of the zeolitic structure, are subjected to controlled heating to obtain a controlled three-step interrelated phenomenon characterized in having a degree of fusion of the zeolitic crystalline structure, release of bound hydroxyls as water, which acts as the blowing agent, and attendant crystalline structure metamorphosis further characterized in having a fusion temperature sufficiently higher than the fusion temperature of the zeolite to set or freeze the resulting structure into the desired low density foamed ceramic. The conditions may be categorized in that the alkali and alkaline earth metal ion concentration and constitution must be adjusted with any specific zeolitic crystalline composition such that the fluxing or fusion temperature has a range of at least 50° C., and preferably broader, as to about 350° C., from its inception and over which range the fused state retains its foamable qualities; that the firmly-bound hydroxyl concentration, exclusive of externally-held water, is in the order of 0.2 to 3% by weight of the zeolite and further characterized in that an effective amount of the dehydroxylation occurs in the temperature range of fusion; and finally that the metamorphosis from the crystalline zeolitic structure through an amorphous state during fusion to a different crystalline, non-zeolitic structure having a fusion or melting temperature at least 50° C. above the upper temperature limit of acceptable foam formation occurs substantially simultaneously with the effective amount of dehydroxylation.

GENERAL AND SPECIFIC DESCRIPTION OF OF THE INVENTION

A better understanding of the invention can be had through descriptions describing but not limited to effective systems in which several commercially available calcium-exchanged sodium zeolites having crystalline structure of the molecular sieve type are employed.

Example I

A sample of commercially available calcium-exchanged sodium zeolite, identified to the trade as 5A zeolite, was placed in a container and heated from room temperature to 1100° C. in the course of one-half hour, the material was held at 1100° C. for 10 minutes and then cooled to room temperature. The product upon examination by X-ray diffraction analysis showed a conversion from the zeolitic crystalline structure to a crystalline structure substantially similar to anorthite, which has the composition $CaO \cdot Al_2O_3 \cdot 2SiO_2$, and substantially free of detectable zeolitic crystallinity. Duplicating runs with other samples of the same type of zeolite gave similar results. The products had an open porous structure of approximately 85 vol. porosity with macroporous distribution of approximately 75% in the 5 to 30μ range. The porosity in the 5 to 30μ region was equal to about 2.4 cc./g. The bulk densities were 0.20 to 0.25 kg./liter. Attempts to determine the "true" density developed values in the range of 1.8–2.1 g./cc. Since the "true" density of the ingredients is higher than the developed values, these lower values are indicative of the presence of an appreciable number of closed pores. The surface area was approximately 5 meters$^2$/g. and the volumes of the final products were approximately four times that of the original material prior to heating. The products were rigid foamed masses of uniform structure having both strength and rigidity, and capable of sorbing from 2.75 to 5.5 times their own weight of water. When the product was repeatedly heated to 1200° C. slowly there was no showing of any particularly detrimental effect. However, shock heating and cooling to and from 1200° C. resulted in substantial embrittlement.

In the fused-only state the substance is substantially amorphous by X-ray diffraction analysis. Further, the phenomenon of the foam formation as followed through differential thermal analysis (DTA), showed a surprising exotherm where the crystalline zeolite converted to the amorphous state followed by a subsequent exotherm indicative of the conversion of the amorphous state to the new crystalline, non-zeolitic form.

Examples II–VII

In other operations, again with 5A zeolite, one sample was heated at 110° C. for approximately six hours in vacuum, another sample was equilibrated for six hours in an atmosphere of 100% relative humidity, and still another sample was equilibrated in a $CO_2$ atmosphere for two hours. Each of these samples was then subjected to heating to 1100° C. over a one-half hour period with resultant conversion to low density ceramics, each of such products showing no substantial difference from the product obtained with dried-only samples. When a sample was dried at 400° C. overnight and then subjected to heating at 1100° C., there was some diminution in the volume increase with minor related changes in the other physical properties.

Examples VIII and IX

In another set of experiments two different zeolites were employed. One was 5A zeolite and the other was a calcium-exchanged, low silica to alumina ratio faujasite, commercially available as 10× sieve. Each of these samples was oven-dried at 200° C. for two hours and then further split into three samples. The three samples from the 5A zeolite and the three samples from the 10× zeolite were separately heated to 950°, 1000° and 1050° C. The samples were held at temperature for about 30 minutes. The products from the heating of 5A sieve were of the type and nature as described above in Example I and showed some increase in volumetric expansion with increasing temperatures. The products from the heated 10× sieve showed a moderate expansion characterized by substantially uniform porosity and density lower than the original zeolite. No major volumetric effect on the foamed 10× sieve products was noted throughout the tested temperature range.

Examples X and XI

In other trials a sample of 4A zeolite, a synthetic zeolite in the sodium form, was tested by subjecting to heating. This material, because of an amount of alkali metal in excess of requirements, fused at a temperature below about 820° C. and upon cooling was a glassy, substantially solid material of relatively high density.

A sample of Arizona chabazite when subjected to heating within the described temperature ranges showed some intumescence with the release of hydroxyl components; however, the intumescence, which was very slight and considerably less than double the volume of the original chabazite, was not capable of being captured in a form having value as a low-density foamed ceramic.

Example XII

A set of structural blocks, suitable in insulating-wall construction, was prepared. Shaped trays were loaded with portioned amounts of 5A sieve taking into consideration the volumetric increase during formation. The trays were placed in a furnace, preheated to 1100° C., and the tray contents brought to temperature and held at temperature for approximately ten minutes. The trays were removed and their contents cooled to room temperature. The contents had the foamed structure similar to that described in Example I. Upon removal from the trays the products had the configuration of the trays except for a slight "bun" on top. Removal of the "bun" gave blocks having dimensions of 4" width, 2" height and 8" length. The density and porosity were substantially as described in Example I and these low density blocks were eminently suitable as insulating and sound-deadening wall structure elements.

Example XIII

A sample of 4A molecular sieve is subjected to base-exchange treatment with an aqueous solution of barium chloride. Conditions of the exchange are adjusted to effect exchange of barium for approximately two-thirds of the sodium ions held in base-exchange positions. After washing and drying, this barium-exchanged zeolite is heated to 1000° C. over a half-hour and then kept at temperature for fifteen minutes. Upon cooling the product has the low-density, porous nature of a foamed ceramic with a bulk density of less than 0.3 kg./l. The product has more than three times the volume of the barium-form zeolitic material. Upon examination by X-ray diffraction analysis the original zeolitic crystalline pattern is substantially gone and is replaced by a pattern most closely related to a barium feldspathoid.

Other trials establish that suitable compositions of synthetic zeolitic structure properly associated with the alkali and alkaline earth metal ions contributing to the proper fusion temperature range fuse within the range of 850° C. to approximately 1200° C., with the preferred fusion temperature lying within the range of 900 to 1150° C. The amount of alkali metal and/or alkaline earth metal components other than in the ion exchange positions in the synthetic crystalline zeolite should be substantially nil. This may be determined, for example, in such zeolites in having negligible water-extractable alkali and/or alkaline earth metal components. Respecting such alkali and alkaline earth metal components in the ion exchange positions, the effective amounts lie in the range of equivalency to the proportions of 50–90% CaO and 10–50% $Na_2O$. Such chemical equivalency in general follows Richter's laws on flux agents as modified by Rieke, e.g., in that the alkaline earth metal group shows with the lower molecular weight elements a somewhat higher fluxing tendency than the higher molecular weight elements on the basis of equivalent additions.

It was also found that the conversion to a non-zeolitic form comprising crystalline components identifiable by X-ray diffraction produced a product having a fusion temperature at least 50° C. higher than the upper temperature limit for successful formation of foamed product. Further, it was found, as substantiated by DTA analysis, that the order of phase change was indeed that involving the occurrence of recrystallization to a non-zeolitic form subsequent to initiation of fusion of the zeolitic precursor. When the zeolite was heated to a temperature appreciably above about 1200° C. such as to 1300° C. or higher, the product obtained was a relatively high density glass and therefore outside the acceptable requirements, e.g. a bulk density of less than 0.3 kg./l., of this invention. Other tests show that compositions having a zeolitic crystalline structure with a properly adjusted alkali and alkaline earth metal ion distribution on the base exchange sites are further characterized in having approximately from 0.2 to 3 wt. percent of the zeolite of strongly-held or compositional OH (hydroxyl), and can be converted by heating in the above-described temperature range to a low density crystalline ceramic having an enlarged volume in the order of 2 to 5 times that of the original material.

While tests have not established whether the subject phenomenon is thermodynamically controlled or rate controlled, such tests have established that a minimum time of about ten minutes in the required temperature range is needed to obtain an effective and reasonably complete conversion to the desired low-density product. As shown above in Example I and as found in other tests, the length of time beyond the ten minute initial period that the material is held at temperature within the described temperature range has no particularly beneficial effect beyond about one or two hours which appear sufficient for all practical purposes. No particularly detrimental effect results, however, even at extended time, such as up to about 10 hours within the proper temperature range.

Obviously, many modifications and variations of the invention as hereinbefore set forth may be made without departing from the spirit and scope thereof, and therefore only such limitations should be imposed as are indicated in the appended claims.

What is claimed is:

1. In the preparation of a low density, foamed ceramic composition the process comprising,
   (a) heating a synthetic crystalline zeolite characterized in a compositional hydroxyl content in the range of 0.2 to 3.0% by weight of the zeolite, and at least one member of the ions selected from the group consisting of the alkali and alkaline earth metal ions in and on the base-exchange sites of the zeolite and acting as fluxing agent promoting fusion at a temperature within the range of 850° C. to 1200° C., said heating being at a temperature within the range of 850° C. to 1200° C. for a time of at least ten minutes;

(b) fusing said zeolite by said heating and effecting dehydroxylation with resultant foaming of the fused zeolite;

(c) continuing said heating to only such point where substantially all of said fused zeolite is recrystallized to a non-zeolite crystal-form having an initial fusion temperature at least 50° C. higher than the upper temperature limit of acceptable foam formation, and effecting such recrystallization with no substantial change in said foamed zeolite other than said recrystallization; and (d) recovering as product a low-density, non-zeolitic ceramic composition having crystallinity detectable by X-ray diffraction analysis.

2. The process in accordance with claim 1 further characterized in that said heating and fusing of said zeolite is effected at a temperature within the range of 900° to 1150° C.

3. The process in accordance with claim 1 further characterized in that said alkali and alkaline earth metal ions in and on the base-exchange sites of said zeolite comprise the equivalency to the proportions of 50–90% CaO and 10–50% $Na_2O$ of the total ion exchange capacity of said zeolite.

4. The process in accordance with claim 3 further characterized in that said zeolite fuses over the range of at least 50° C. and up to 350° C. above fusion inception temperature of at least 850° C.

5. The method of preparing a low-density, ceramic foam comprising, heating 5A molecular sieve at a temperature in the range of 900° C. to 1150° C. over a time period in the range of ten minutes to two hours thereby effecting fusion, foaming and recrystallization to a foamed non-zeolitic crystalline structure characterized, upon cooling, by a surface area of less than about 5 square meters per gram, a bulk density of less than 0.3 kilogram per liter and approximately 75–80% pores having diameters in the 5–30μ range and substantially uniformly distributed throughout the structure.

6. A low density ceramic foam having structural strength and rigidity, said foam comprising a plurality of uniformly distributed pores contributing a porosity of at least 75 volume percent, said foam having been prepared by method steps including:

(a) preparing a synthetic hydrated crystalline zeolite having a composition corresponding to a sodium aluminodisilicate Zeolite A;

(b) subjecting the sodium aluminodisilicate to ion exchange to provide a 5A molecular sieve in which the alkali and alkaline earth metal ions in and on the base exchange sites of said zeolite comprise the equivalency to the proportions of 50–90% CaO and 10–50% $Na_2O$ of the total ion-exchange capacity of said zeolite;

(c) controlling the hydroxyl content of the calcium sodium aluminodisilicate 5A molecular sieve to be within the range from about 0.2 to about 3% by weight of the crystalline zeolite;

(d) effecting fusion, foaming, and recrystallization of the calcium sodium aluminodisilicate to provide a non-zeolitic ceramic foam by heating in the range of 900 to 1150° C. over a time period in the range of ten minutes to two hours;

(e) cooling said calcium sodium aluminodisilicate to provide a ceramic foam having a bulk density of less than about 0.3 kilogram per liter, the pores having diameters from about 5 to about 30 microns contributing about 75% of the porosity, said ceramic foam having a surface area of less than about 5 square meters per gram.

References Cited

UNITED STATES PATENTS

| | | | |
|---|---|---|---|
| 2,706,844 | 4/1955 | Nicholson | 106—40X |
| 3,158,579 | 11/1964 | Pollitzer et al. | 252—455 |
| 3,271,323 | 9/1966 | Whittermore | 106—40X |
| 3,411,888 | 11/1968 | Westerland et al. | 23—111X |
| 3,449,070 | 6/1969 | McDaniel et al. | 23—111 |

OTHER REFERENCES

Hurlbut, C. S.; Manual of Minerology (David, J. D.), New York (Wiley & Sons, Inc.), 1941, pp. 286–287, 296–299.

HELEN M. McCARTHY, Primary Examiner
W. R. SATTERFIELD, Assistant Examiner

U.S. Cl. X.R.

23—111; 252—378; 264—43